Oct. 14, 1969  A. A. CARIDIS ET AL  3,472,155
FOOD COOKER

Filed May 21, 1968  2 Sheets-Sheet 1

INVENTOR.
Andrew A. Caridis
Clark K. Benson
Attorneys

Oct. 14, 1969  A. A. CARIDIS ET AL  3,472,155
FOOD COOKER
Filed May 21, 1968  2 Sheets-Sheet 2

INVENTOR.
Andrew A. Caridis
Clark K. Benson
Flehr, Hohbach, Test,
Albritton & Herbert
Attorneys

United States Patent Office 3,472,155
Patented Oct. 14, 1969

3,472,155
FOOD COOKER
Andrew A. Caridis and Clark K. Benson, Millbrae, Calif., assignors to Heat and Control, Inc., South San Francisco, Calif., a corporation of California
Filed May 21, 1968, Ser. No. 730,731
Int. Cl. A47j 37/12
U.S. Cl. 99—404                                7 Claims

ABSTRACT OF THE DISCLOSURE

Food cooker with a vat adapted to hold a quantity of cooking oil and an endless conveyor with at least one run of the endless conveyor which travels in the vat in relatively close proximity to the bottom wall of the vat. Lengths of a mesh-like material are secured to the inner surface of the conveyor so that they can depend therefrom and travel along the bottom wall of the vat to prevent the collection of food particles on the bottom wall of the vat.

BACKGROUND OF THE INVENTION

Food cookers have heretofore been provided. For example, in Patents 3,309,981 and 3,209,678, there are disclosed food cookers which can be utilized for cooking of food. However, in the cooking of breaded products such as chicken parts and fish sticks, it has been found that there is a tendency for some of the breading crumbs to separate from the product and drop through the conveyor which carries the food product through the cooking oil in the vat. Attempts have been made to provide scrapers which are carried by the endless conveyor belt to prevent collection of such food particles on the bottom wall of the vat, but it has been found that there are uneven surfaces in the bottom wall of the vat and that the bread product has a tendency to collect thereon and char or carbonize. This causes small black carbon-like particles to pass into the cooking oil and to also collect upon the product being cooked which substantially detracts from the appearance of the product. There is, therefore, a need for a new and improved food cooker which will overcome these problems.

SUMMARY OF THE INVENTION AND OBJECTS

The food cooker comprises a pan adapted to hold a quantity of cooking oil and an endless conveyor having at least a portion of one run of the same which travels in the pan and is adapted to carry the product to be cooked. Strips of a mesh-like material are secured to the inner side of the conveyor belt and are adapted to ride on the bottom wall of the vat to prevent particles from collecting in the bottom of the pan and to keep them in suspension so that they will move with the oil in the pan and are filtered from the oil when it is removed from the pan.

In general, it is an object of the present invention to provide a food cooker which prevents charring or carbonizing of any portions of the product which fall off of the product as it is advanced through the food cooker.

Another object of the invention is to provide a food cooker of the above character in which particularly novel means is carried by the conveyor belt for preventing collection of food particles on the bottom of the pan.

Additional objects and features of the invention will appear from the following description in which the preferred embodiment is set forth in conjunction with the accompanying drawing.

DESCRIPTION OF THE PREFERRED EMBODIMENT

Figure 1:
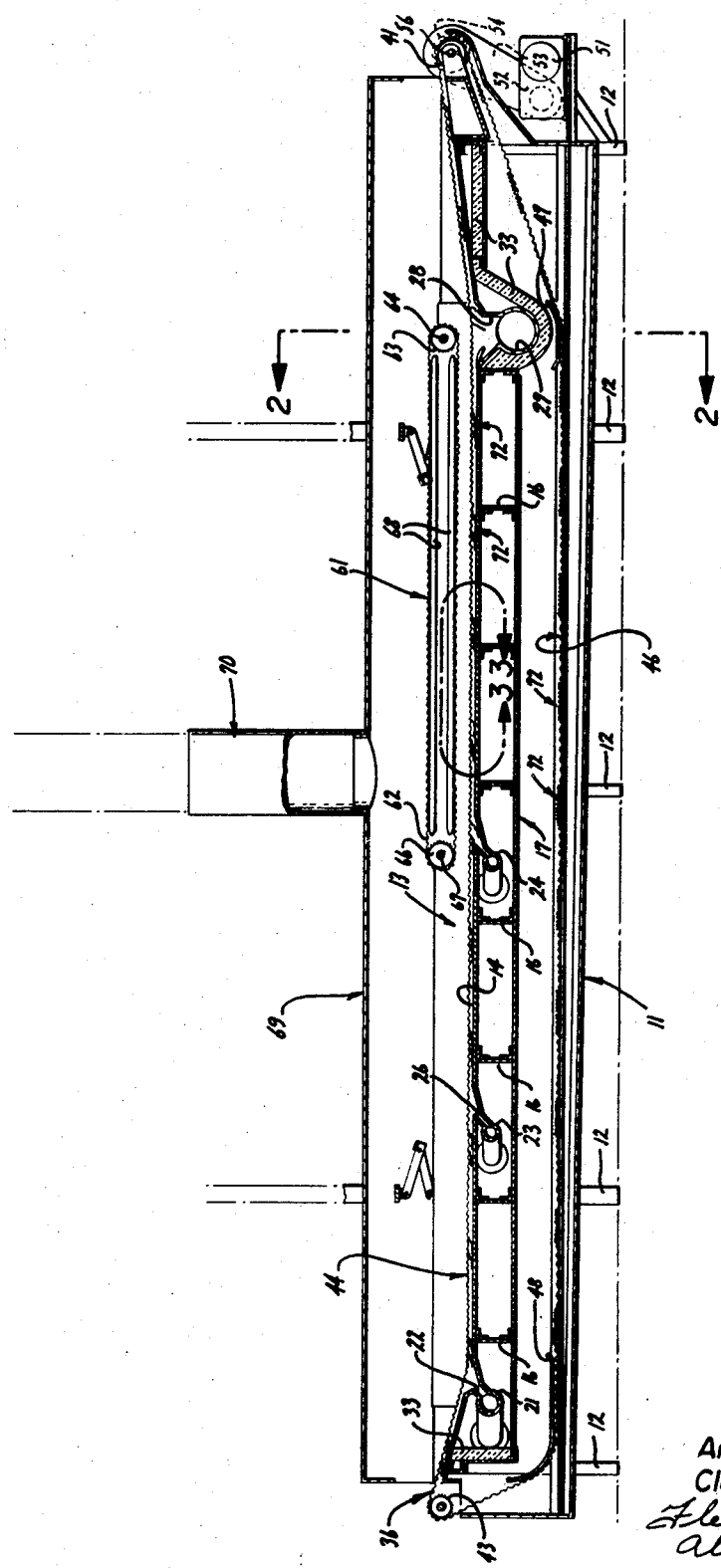
FIGURE 1 is a side elevational view in cross-section of a food cooker incorporating the present invention.

The food cooker incorporating the present invention consists of a housing 11 which is mounted upon legs 12. A cooker pan 13 is mounted within the housing 11. The cooker pan 13 is of a conventional type and is provided with a bottom wall 14 which is substantially horizontal except that the inlet and outlet portions of the bottom wall of the pan are upwardly inclined as can be seen from FIGURE 1. The bottom wall 14 of the cooker pan is supported by reinforcing members 16 forming a part of the framework 17 for the cooker pan 13.

Means is provided for introducing cooking oil into the cooker pan 13 similar to that described in Patent No. 3,209,678. Thus, cooking oil is introduced into the inlet of the cooker pan 13 by a pipe 21 which is provided with means forming a plurality of passages 22 pointing upwardly and forwardly into the inlet of the cooker pan to introduce cooking oil upwardly and forwardly into the pan. Additional means is provided for introducing cooking oil into the pan 13 at points intermediate the inlet and discharge end and consists of pipes 23 and 24 which are provided with means forming passages 26 which also introduce the cooking oil in upwardly and forwardly inclined jet streams. A large collector trough 27 is provided near the discharge end of the cooker pan. A large slot 28 is provided in the bottom wall of the cooker pan to permit the cooking oil from the cooking pan to flow forwardly down into the collector trough 27. The collector trough 27 is connected to a pipe 29 which is connected to a pump 30. The pump 30 supplies the cooking oil to a filter 31 and thence to a heater 32, after which it is again re-circulated through the cooking pan by introducing the same through the pipes 21, 23 and 24. The cooker pan 31 is provided with suitable insulation 33 where required.

Figure 4:
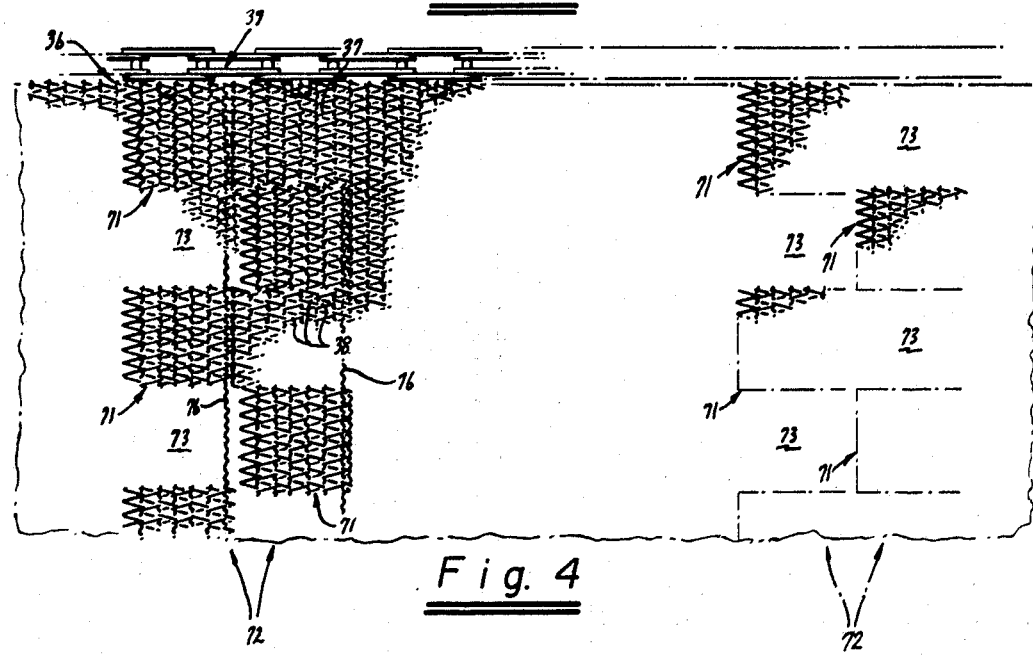
FIGURE 4 is a cross-sectional view taken along the line 4—4 of FIGURE 3.
Figure 2:
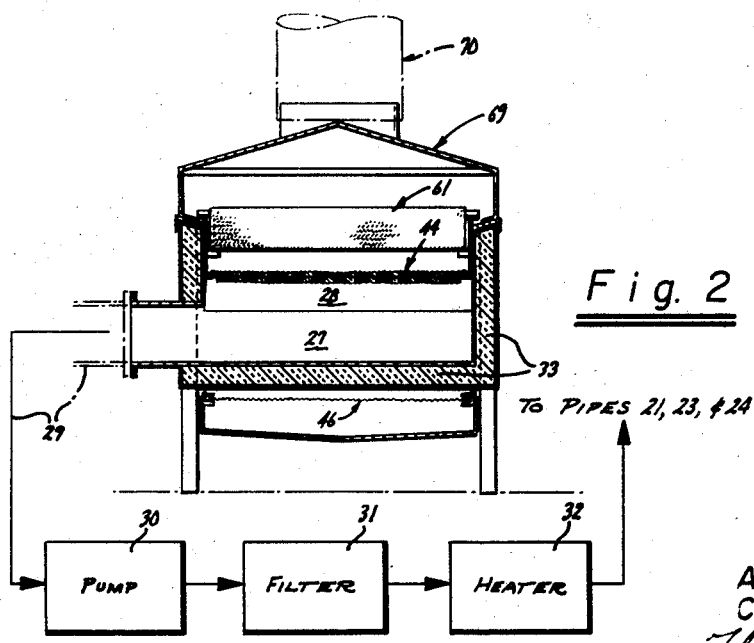
FIGURE 2 is a cross-sectional view taken along the line 2—2 of FIGURE 1.

The food cooker also includes an endless conveyor belt 36. The endless conveyor belt 36 can be formed of any suitable material. One type of material found to be particularly satisfactory is a metal mesh belt of the type which is shown in FIGURE 4 which is provided with relatively small V-shaped openings 38. The metal mesh material 37 is relatively flexible. A chain 39 is mounted on each side of the sheet-like material which forms the conveyor belt and is reeved over drive sprockets 41 provided near the discharge end of the cooker pan. A roller (not shown) is provided between the drive sprockets 41 over which the conveyor belt travels. The endless conveyor belt 36 also travels over idler sprockets 43 provided at the inlet end of the cooker pan and between which there is also provided a roller (not shown) upon which the conveyor belt travels.

As can be seen from FIGURE 1, the upper run 44 of the conveyor belt droops downwardly and travels in relatively close proximity to the bottom wall of the cooker pan 13. The cooker pan 13 is normally filled with oil to a suitable level as, for example, to a depth of 3 or 4 inches, so that at least a portion of the upper run of the conveyor belt travels in the cooking oil. The lower run 46 of the belt travels below the cooker pan and is guided in its travel by guide shoes 47 and 48.

The endless conveyor belt 36 is driven by a motor 51 mounted upon a gear box 52 secured to the housing 11. The gear box 52 drives a chain 53 which drives a large sprocket 54 mounted on a shaft 56 on which the drive sprockets 41 are mounted.

An endless hold-down conveyor belt 61 is provided and is constructed in a similar manner as the endless conveyor belt 36. It is formed of a metal mesh material 62 which has chain edges mounted on drive sprockets 63 mounted on a drive shaft 64. The conveyor also passes over idler sprockets 66 mounted upon a shaft 67. The shafts 64 and 67 are carried by a framework for the hold-down conveyor which includes the members 68. The hold-down conveyor 61 is driven from the drive for the main endless conveyor 36 by suitable means such as a chain and sprockets (not shown) interconnecting the shafts 64 and 56.

The food cooker thus far described is substantially conventional and is utilized for the cooking of many food products and, in particular, breaded products such as chicken parts and fish sticks. The products to be cooked are placed upon the upper run 44 of the main endless conveyor belt 36 and are advanced through the cooking oil at a predetermined rate of speed so that when they are elevated out of the cooking oil at the end of the run through the cooking oil in the cooker pan 13, they have been sufficiently cooked. The food cooker is also provided with a hood 69 which overlies the cooker 13 and which is connected to a stack 70. As explained previously, it has been found that in the cooking of such products, breading crumbs from the product very often drop off of the product and drop through the mesh-like conveyor belt and fall to the bottom of the pan where they become charred and carbonize and give the undesirable effects hereinbefore described.

Particularly novel means has been provided to overcome this problem and consists of a plurality of sections 71 of a mesh-like flexible material which are secured to the inner surface of the main endless conveyor 36. One material found to be particularly satisfactory for the sections 71 is the providing of sections of metal mesh of the same material as the conveyor belt. Thus, in accordance with the present invention, sections which are approximately 3 inches wide and 4 inches long are secured in longitudinally spaced rows 72 extending transversely of the conveyor belt. In each of the rows 72, the sections are spaced apart transversely of the belt so that there is provided a space 73 between each of the sections. As also can be seen from FIGURE 4, the alternate rows have the sections 71 staggered with respect to each other so that the row immediately behind the preceding row has sections which overlap the spaces provided in the preceding row so that with each two rows 72, there are sufficient sections 71 so that all portions of the entire width of the main conveyor belt 36 and the cooker pan 13 are covered.

By way of example, it has been found that with a conveyor belt 36 inches in width that the sections could be approximately 3 inches wide and 4 inches long with an approximate ¼ inch overlap between the sections of one row and the sections of another row. The rows 72 were spaced approximately 18 inches apart.

The sections 71 can be secured to the inside of the conveyor belt 36 in a suitable manner such as by small rods 76 which extend through the mesh of the conveyor belt and which also extend through loops of the sections to secure one end of each of the sections to the inside surface of the conveyor belt 36. As can be seen from FIGURE 3, the sections 71 have such a length that substantial portions of the same rest upon the bottom wall 14 of the cooker vat 13. This staggered overlapping relationship is particularly apparent from the right-hand side of FIGURE 4.

In operation of the food cooker in cooking a product such as breaded fish sticks, it has been found that even though certain of the breading crumbs drop off of the fish sticks and through the conveyor 36 that they are prevented from collecting on the bottom wall of the cooker pan 13 because of the action of the mesh-like sections 17.

The mesh-like sections serve to keep any portions of the food product, such as bread crumbs, from collecting on the bottom of the cooker pan and, in effect, keep them in suspension within the cooking oil so that they are advanced with the cooling oil and are carried down the collector trough 27 and are removed by the filter 31. It has been found that the mesh-like sections 71 have been particularly efficacious in accomplishing this result because they are very flexible and able to accommodate any irregularities, valleys or contours in the bottom wall of the pan so that all surfaces of the bottom wall of the pan are continuously wiped clean of any food product. This prevents any of the product from collection in certain areas of the cooker pan and staying in one location and becoming carbonized.

Figure 3:
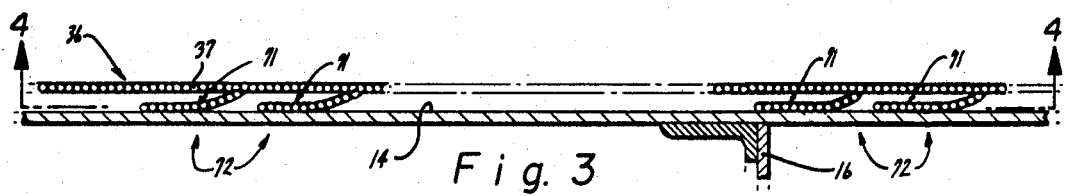
FIGURE 3 is an enlarged cross-sectional view taken along the line 3—3 of FIGURE 1.

As can be seen from FIGURE 3, substantial portions of each of the sections wipe the bottom wall of the vat so that the food particles are continuously stirred up and kept in suspension. This action is enhanced as the sections travel over the jets of oil which are introduced through the flow passages 22 and 26. These jets of oil also serve to wipe the sections clean of any food particles and to also force them into suspension in the cooking oil so that they travel in the cooking oil. It also is possible that some portions of the food products are actually carried forward by the mesh-like material into the trough 28 which empties into the collector pipe 29.

By providing successive rows of staggered sections, it can be seen that the sections continuously wipe all of the exposed surfaces of the bottom wall of the cooker pan 13. The mesh-like material which forms the sections has a tendency to lay flat on all the surfaces of the cooker pan even if some of the surfaces of the cooker pan are uneven so that the surfaces are repeatedly wiped by these sections to prevent the collection of any food particles upon the bottom wall of the cooker pan. It has been found that these sections on the under side of the upper run of the conveyor belt readily travel over the rollers provided on both ends of the conveyor belt and do not affect the normal operation of the endless conveyor. When the sections 71 are returning to the inlet side, it can be seen from FIGURE 1 that the sections lie flat upon the inside surface of the lower run of the conveyor belt 36 and thus can readily travel over the roller provided in the inlet end of the food cooker.

It is apparent from the foregoing that there has been provided a new and improved food cooker which is particularly efficacious in the cooking of products in which there is a tendency for portions of the product to fall off and to drop into the cooker vat. With such a food cooker, it has been found that it is possible to cook a product very uniformly without any black specks or the like being formed on the same by carbonized material being created within the cooking vat. The unique mesh-like sections serve to prevent material from collecting on the bottom of the cooker pan and, therefore, serve to maintain this material in suspension so that it travels with the cooking oil and does not remain in the cooking oil and does not remain in the cooking oil any longer than the product would normally remain in the cooking oil and, therefore, prevents carbonizing of the material.

We claim:

1. In a food cooker, a cooker pan having a bottom wall and adapted to hold a quantity of oil, an endless conveyor, at least a portion of one run of the endless conveyor travelling in the oil in the cooker pan in relatively close proximity to the bottom wall of the cooker pan, the endless conveyor being adapted to carry the product to be cooked, and sections of a mesh-like material secured to the inside of the conveyor, said sections having a length so that when the portion of the conveyor to which they are attached is travelling in the upper run, they depend downwardly and engage the bottom wall of the cooker pan and serve to wipe the bottom wall of the cooker pan to prevent portions of the food product being cooked which have dropped off from collecting on the bottom wall of the pan.

2. Apparatus as in claim 1 together with means for continuously recirculating the oil in the cooker pan, and means for filtering food particles from the cooking oil.

3. A food cooker as in claim 1 wherein said sections of mesh-like material are formed of a flexible metal mesh.

4. A food cooker as in claim 1 wherein said sections of mesh-like material extend laterally across the endless conveyor and are spaced longitudinally of the endless conveyor.

5. A food cooker as in claim 1 wherein the sections are arranged in spaced rows extending transversely of the conveyor belt and wherein each of said sections has a width which is substantially less than the width of the conveyor belt and wherein said sections in two adjacent rows are staggered with respect to each other but overlap each other in a direction extending transversely of the conveyor belt.

6. A food cooker as in claim 5 wherein said sections are flexible in a direction which is perpendicular to the plane in which the section lies so that the sections are adapted to accommodate irregularities in the surface of the bottom wall of the pan to wipe all surfaces of the pan.

7. A food cooker as in claim 1 together with means for introducing jets of oil into the cooker pan so that the jets of oil impinge upon the sections to wipe the sections clean of food product.

References Cited

UNITED STATES PATENTS

| | | | |
|---|---|---|---|
| 1,926,313 | 9/1933 | Smith | 99—404 X |
| 2,042,655 | 6/1936 | Ferry | 99—405 |
| 2,538,937 | 1/1951 | Foster | 99—404 |
| 2,696,776 | 12/1954 | McBean | 99—404 X |

ROBERT W. JENKINS, Primary Examiner

U.S. Cl. X.R.

99—408